(12) United States Patent
Shimada et al.

(10) Patent No.: US 12,111,661 B2
(45) Date of Patent: Oct. 8, 2024

(54) MOBILE BODY SYSTEM

(71) Applicant: TOYOTA JIDOSHA KABUSHIKI KAISHA, Aichi-ken (JP)

(72) Inventors: Yoshihiro Shimada, Tokyo (JP); Zixun Mei, Tokyo (JP); Hiroyuki Kobayashi, Mitaka (JP); Hideki Fukudome, Toyota (JP); Tomoko Asai, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 259 days.

(21) Appl. No.: 17/720,298

(22) Filed: Apr. 14, 2022

(65) Prior Publication Data

US 2022/0390949 A1 Dec. 8, 2022

(30) Foreign Application Priority Data

Jun. 4, 2021 (JP) ................. 2021-094198

(51) Int. Cl.
| | |
|---|---|
| *G05D 1/00* | (2024.01) |
| *B60P 1/02* | (2006.01) |
| *B60P 3/00* | (2006.01) |
| *B62D 33/04* | (2006.01) |
| *B62D 53/00* | (2006.01) |
| *G01G 19/08* | (2006.01) |
| *G06V 20/59* | (2022.01) |
| *G06V 20/64* | (2022.01) |

(52) U.S. Cl.
CPC ............ *G05D 1/0212* (2013.01); *B60P 1/025* (2013.01); *B60P 3/007* (2013.01); *B62D 33/042* (2013.01); *B62D 53/00* (2013.01); *G01G 19/08* (2013.01); *G06V 20/59* (2022.01); *G06V 20/64* (2022.01)

(58) Field of Classification Search
CPC ........ G05D 1/0212; B60P 1/025; B60P 3/007; B62D 33/042; B62D 53/00; G01G 19/08; G06V 20/59; G06V 20/64
USPC ............................................................ 701/23
See application file for complete search history.

(56) References Cited

U.S. PATENT DOCUMENTS

| | | | | |
|---|---|---|---|---|
| 2018/0024554 | A1* | 1/2018 | Brady | ................ G06Q 10/0833 |
| | | | | 701/23 |
| 2019/0188637 | A1* | 6/2019 | Endo | ..................... G06T 1/0007 |
| 2019/0232849 | A1 | 8/2019 | Kaneko et al. | |
| 2019/0317498 | A1* | 10/2019 | Mere | ........................ H04W 4/40 |
| 2020/0117217 | A1* | 4/2020 | Yuzawa | ............. G06Q 10/0833 |
| 2020/0183390 | A1 | 6/2020 | Yu et al. | |
| 2020/0341467 | A1* | 10/2020 | Glendenning | ..... G06Q 10/0832 |
| 2020/0354171 | A1* | 11/2020 | Vincent | .................. B65G 67/24 |
| 2021/0158280 | A1 | 5/2021 | Matsutani et al. | |

(Continued)

FOREIGN PATENT DOCUMENTS

| | | |
|---|---|---|
| CN | 109814545 A | 5/2019 |
| CN | 208867800 U | 5/2019 |
| JP | 2019-067215 A | 4/2019 |

(Continued)

*Primary Examiner* — Krishnan Ramesh

(74) *Attorney, Agent, or Firm* — HAUPTMAN HAM, LLP

(57) ABSTRACT

Provided is a mobile body system including a traveling unit having an autonomous traveling function and a trolley unit having a housing portion for loading an object. A detection unit detects an amount of objects placed on the housing portion. A control unit determines an operation of the traveling unit based on the amount of objects detected by the detection unit.

6 Claims, 11 Drawing Sheets

(56) References Cited

U.S. PATENT DOCUMENTS

| | | | |
|---|---|---|---|
| 2021/0304551 A1* | 9/2021 | Cupersmith | G07F 17/3206 |
| 2022/0067869 A1* | 3/2022 | Warmoth | G06Q 10/06315 |

FOREIGN PATENT DOCUMENTS

| | | |
|---|---|---|
| JP | 2019-131039 A | 8/2019 |
| JP | 2021-086291 A | 6/2021 |

* cited by examiner

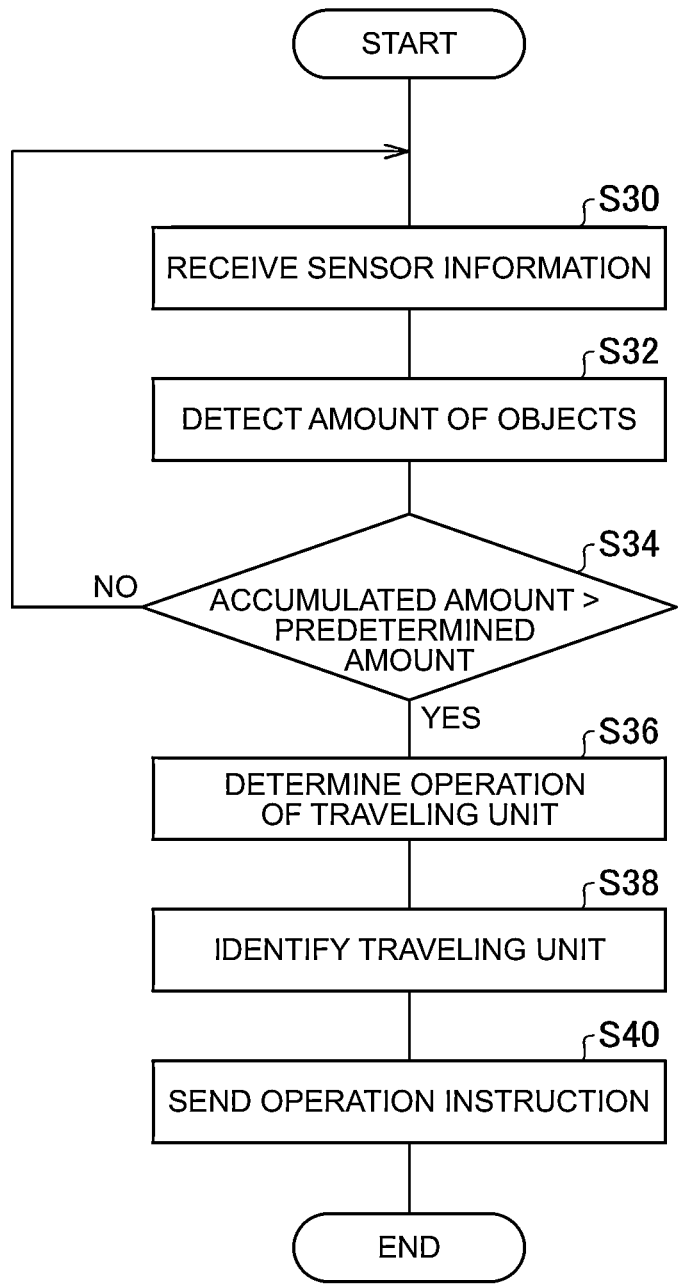

MOBILE BODY SYSTEM

CROSS-REFERENCE TO RELATED APPLICATION

This application claims priority to Japanese Patent Application No. 2021-094198 filed on Jun. 4, 2021, incorporated herein by reference in its entirety.

BACKGROUND

1. Technical Field

The present disclosure relates to a mobile body system including a traveling unit and a trolley unit.

2. Description of Related Art

In recent years, a system for transporting objects such as luggage has been devised using an autonomous vehicle. Japanese Unexamined Patent Application Publication No. 2019-131039 (JP 2019-131039 A) discloses a vehicle that performs autonomous traveling, and that includes a front portion having front wheels, a tail portion having rear wheels, and a loading portion that integrates the front portion and the tail portion by being connected between the front portion and the tail portion. In a state in which the head portion and the tail portion are stopped, the loading portion is configured to be separable from the vehicle and connectable to the vehicle in a direction intersecting with an advancing direction of the vehicle.

SUMMARY

In the system disclosed in JP 2019-131039 A, when a server device receives a vehicle allocation request from outside, it determines an autonomous traveling vehicle to be dispatched and generates an operation instruction in response to the vehicle allocation request. It is expected that a system provided with a mobile body having an autonomous driving function can provide useful services in various scenes.

Thus, an object of the present disclosure is to provide a new mobile body system.

In order to solve the above problems, a mobile body system of an aspect of the present disclosure is a mobile body including a traveling unit having an autonomous traveling function and a trolley unit having a housing portion for loading an object, the mobile body system including: a detection unit that detects an amount of objects placed on the housing portion; and a control unit that determines an operation of the traveling unit based on the amount of objects detected by the detection unit.

It should be noted that any combination of the above components and an expression of the present disclosure converted between a method, a device, a system, a computer program, a recording medium in which the computer program is readable, a data structure, and the like are also effective as an aspect of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 12 is a diagram showing a flowchart of a process in the server device.

DETAILED DESCRIPTION OF EMBODIMENTS

Figure 1:
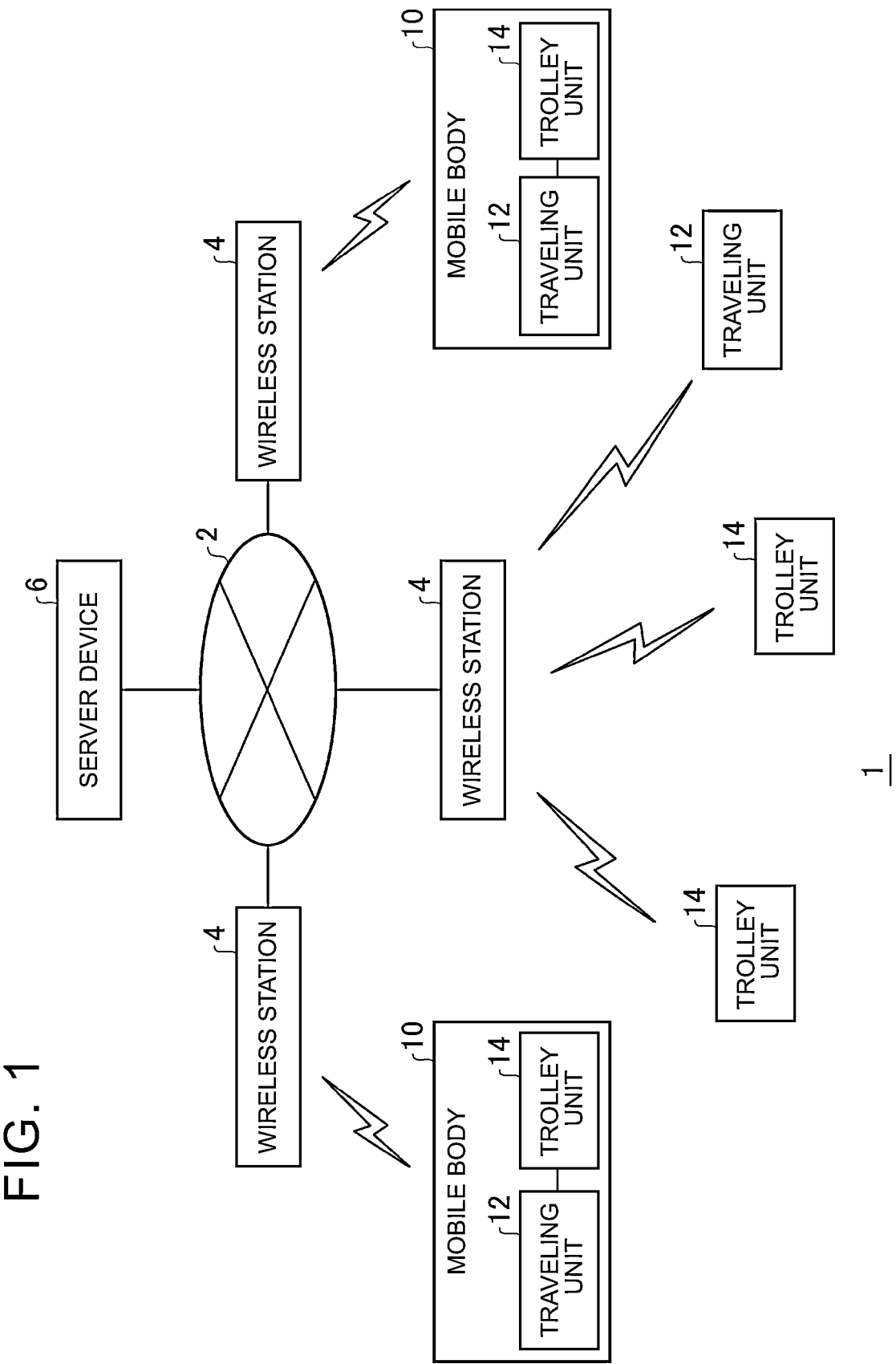
FIG. 1 is a diagram showing an outline of a mobile body system of an embodiment.

FIG. 1 is a diagram showing an outline of a mobile body system 1 of an embodiment. The mobile body system 1 includes a traveling unit 12, a trolley unit 14 on which an object can be placed, and a server device 6. The traveling unit 12 has an autonomous traveling function, while the trolley unit 14 does not have an autonomous traveling function. Each of the traveling unit 12 and the trolley unit 14 has a wireless communication function, and is communicably connected to the server device 6 via a network 2 such as the Internet via a wireless station 4 that is a base station. The traveling unit 12 and the trolley unit 14 can communicate with each other via the network 2. However, may be able to communicate directly with each other without going through the network 2.

In the mobile body system 1, the traveling unit 12 and the trolley unit 14 are configured to be connectable and separable, and the traveling unit 12 and the trolley unit 14 are connected to form a mobile body 10. The traveling unit 12 having an automatic traveling function may be referred to as a mobile body by itself.

Since the traveling unit 12 and the trolley unit 14 are configured to be connectable and separable, the traveling unit 12 can separate from the trolley unit 14 and execute another task when the trolley unit 14 is towed to the destination. For example, if the other task is to tow another trolley unit 14 to another destination, the traveling unit 12 moves to the location where the other trolley unit 14 is disposed, connects to the other trolley unit 14, tows the other trolley unit 14 to the other destination, and detaches from the other trolley unit 14. By configuring the traveling unit 12 and the trolley unit 14 so as to be connectable and separable in this way, the traveling unit 12 can execute tasks related to different trolley units 14 one after another.

The detached trolley unit 14 provides a service at that location. In the embodiment, the trolley unit 14 provides, for example, a store service for selling products or a garbage collection service for collecting garbage. Various services provided by the trolley unit 14 will be described later. When the service is finished, the trolley unit 14 may be connected to the traveling unit 12 and towed to a specific place by the traveling unit 12. In the mobile body system 1, the combination of the traveling unit 12 and the trolley unit 14 constituting the mobile body 10 is not fixed, and the combination of the traveling unit 12 and the trolley unit 14 may be appropriately determined by the server device 6.

The server device 6 manages the locations and states of a plurality of the traveling units 12 and a plurality of the trolley units 14. The state of the traveling unit 12 includes a state indicating whether the task is being executed, and the state of the trolley unit 14 includes a state indicating whether the service is being provided. The server device 6 determines the operation (task) of each traveling unit 12 based on the locations and states of the traveling units 12 and the trolley units 14. The traveling unit 12 operates based on an operation instruction transmitted from the server device 6.

Figure 2:
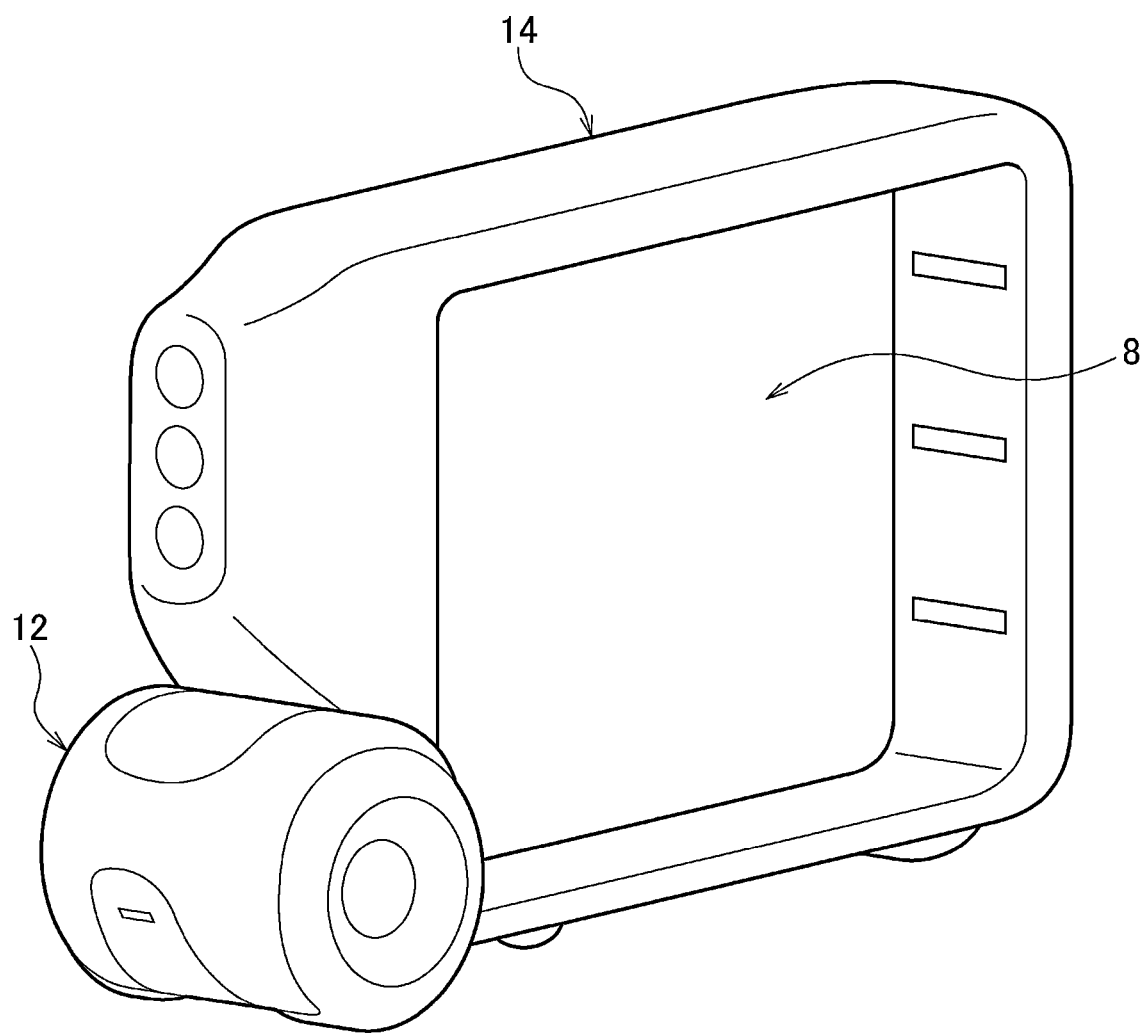
FIG. 2 is a diagram showing a perspective view of a mobile body of the embodiment.

FIG. 2 shows a perspective view of the mobile body 10 of the embodiment. The mobile body 10 is configured by connecting the traveling unit 12 to the trolley unit 14. The trolley unit 14 has a housing portion 8 for loading an object. The total length of the mobile body 10 may be about 2 m (meters) to 3 m, the total width may be about 0.5 m to 1.8 m, and the total height may be about 1.5 m to 2.5 m.

Figure 3:
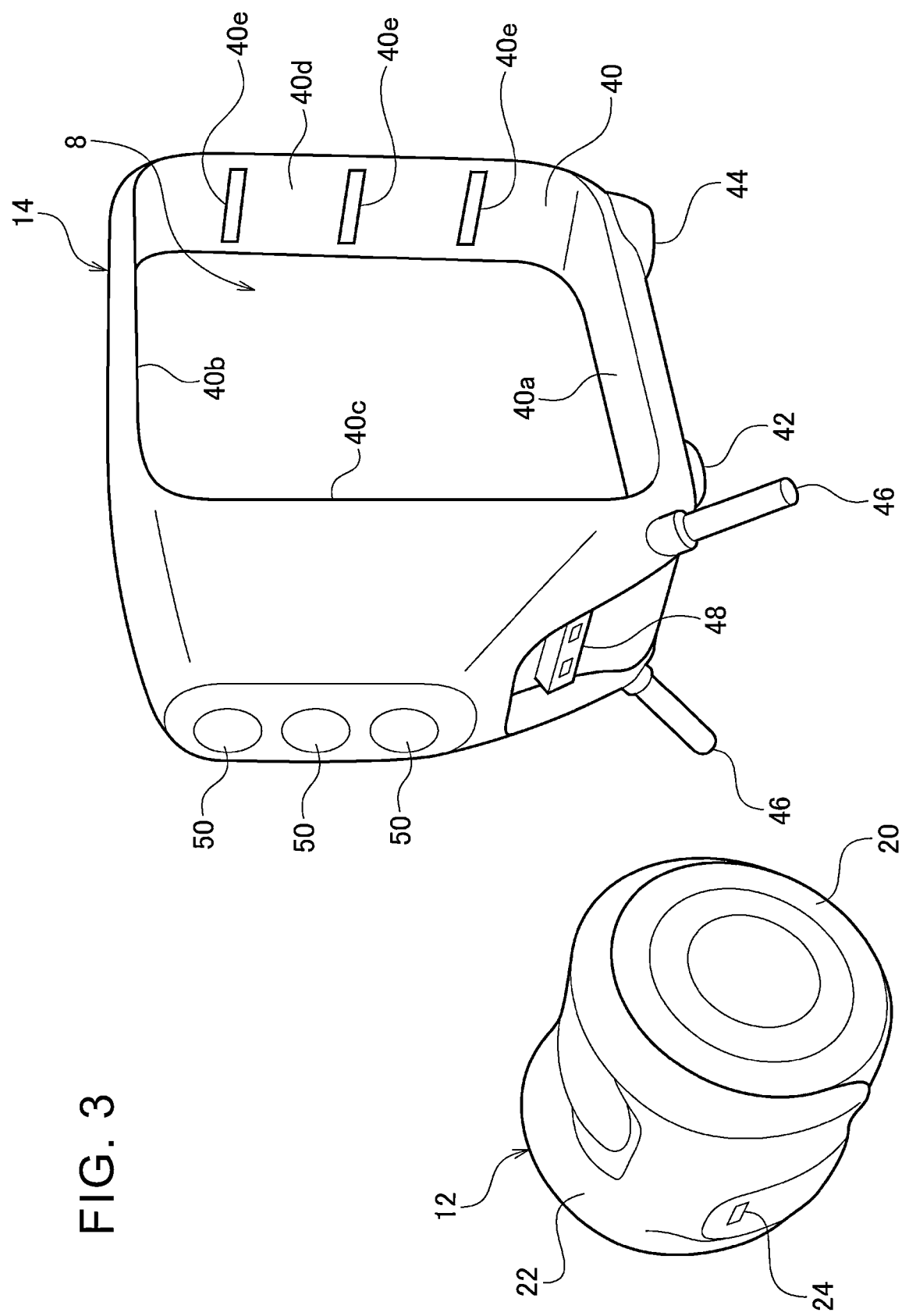
FIG. 3 is a diagram showing a state in which a traveling unit and a trolley unit are separated from each other.

FIG. 3 shows a state in which the traveling unit 12 and the trolley unit 14 are separated from each other. The trolley unit 14 includes a main body portion 40 that forms the housing portion 8. The housing portion 8 is defined by a base portion 40a in which front wheels 42 and rear wheels 44 are provided, a ceiling portion 40b provided facing the base portion 40a, a front wall portion 40c, and a rear wall portion 40d, and is configured as a space extending through in a vehicle width direction. A plurality of ridges 40e facing each other are formed on the front wall portion 40c and the rear wall portion 40d so that shelves and the like can be attached. For example, by arranging shelf boards on the ridges 40e and placing products on the shelf boards, the trolley unit 14 can function as a mobile store that provides store services. In the state where the trolley unit 14 is separated from the traveling unit 12, leg portions 46 of the trolley unit 14 come into contact with the ground so that the trolley unit 14 is immovable, and the location of the trolley unit 14 is fixed.

Opening/closing doors for partitioning the space may be provided on both side surfaces of the housing portion 8.

Figure 4:
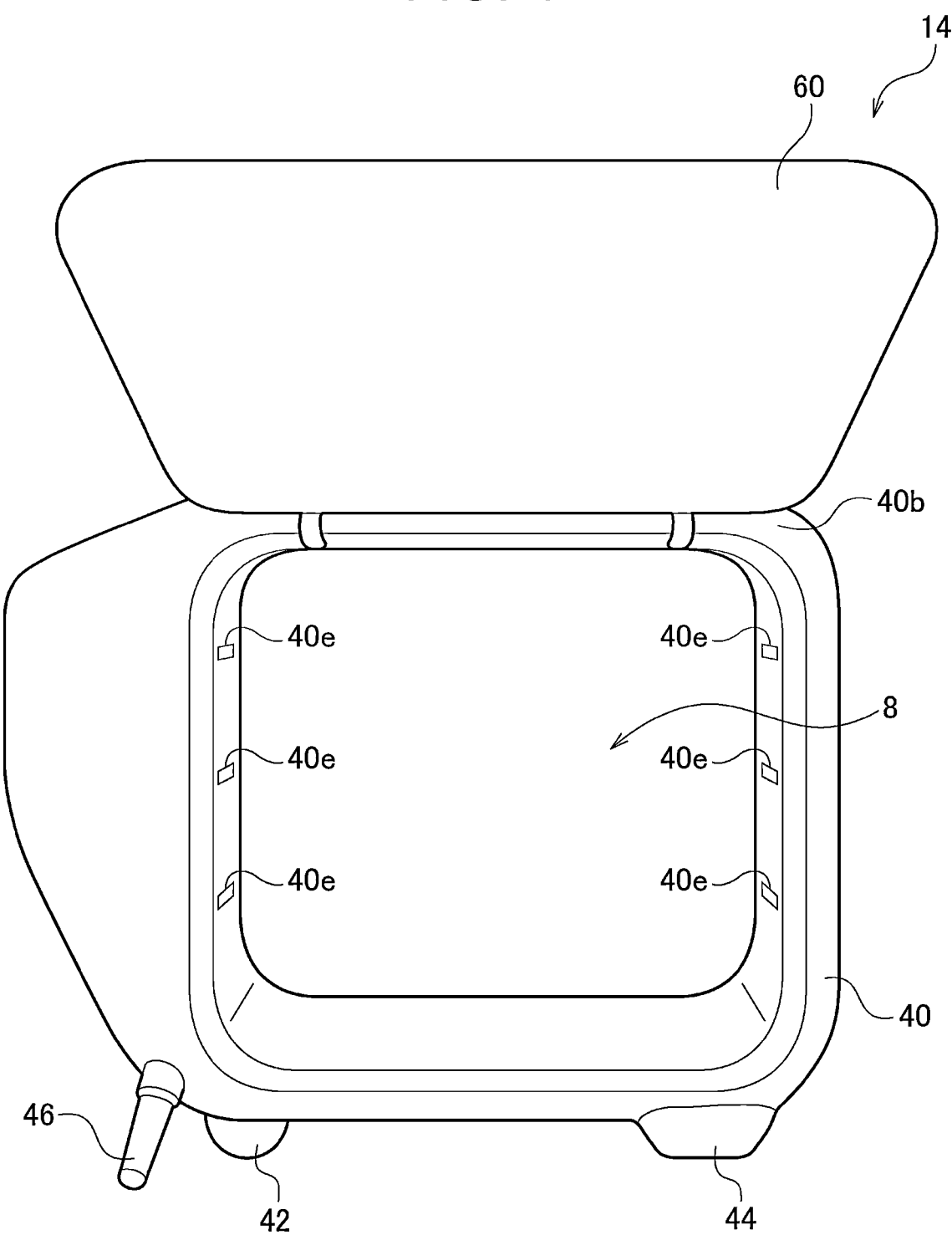
FIG. 4 is a diagram showing an example of a door provided in a main body portion.

FIG. 4 shows an example of a door 60 provided in the main body portion 40. The door 60 may be a flip-up door in which hinges are provided on both side portions of the ceiling portion 40b. By closing the door 60, the housing portion 8 and an external space can be partitioned. Thus, for example, an object placed in the housing portion 8 can be prevented from falling out while moving. In addition, when the service is provided, a shade can be created by opening the door 60. The door 60 may be entirely or partially made of a transparent material or a translucent material so that the inside can be seen from the outside in a closed state.

Figure 5:
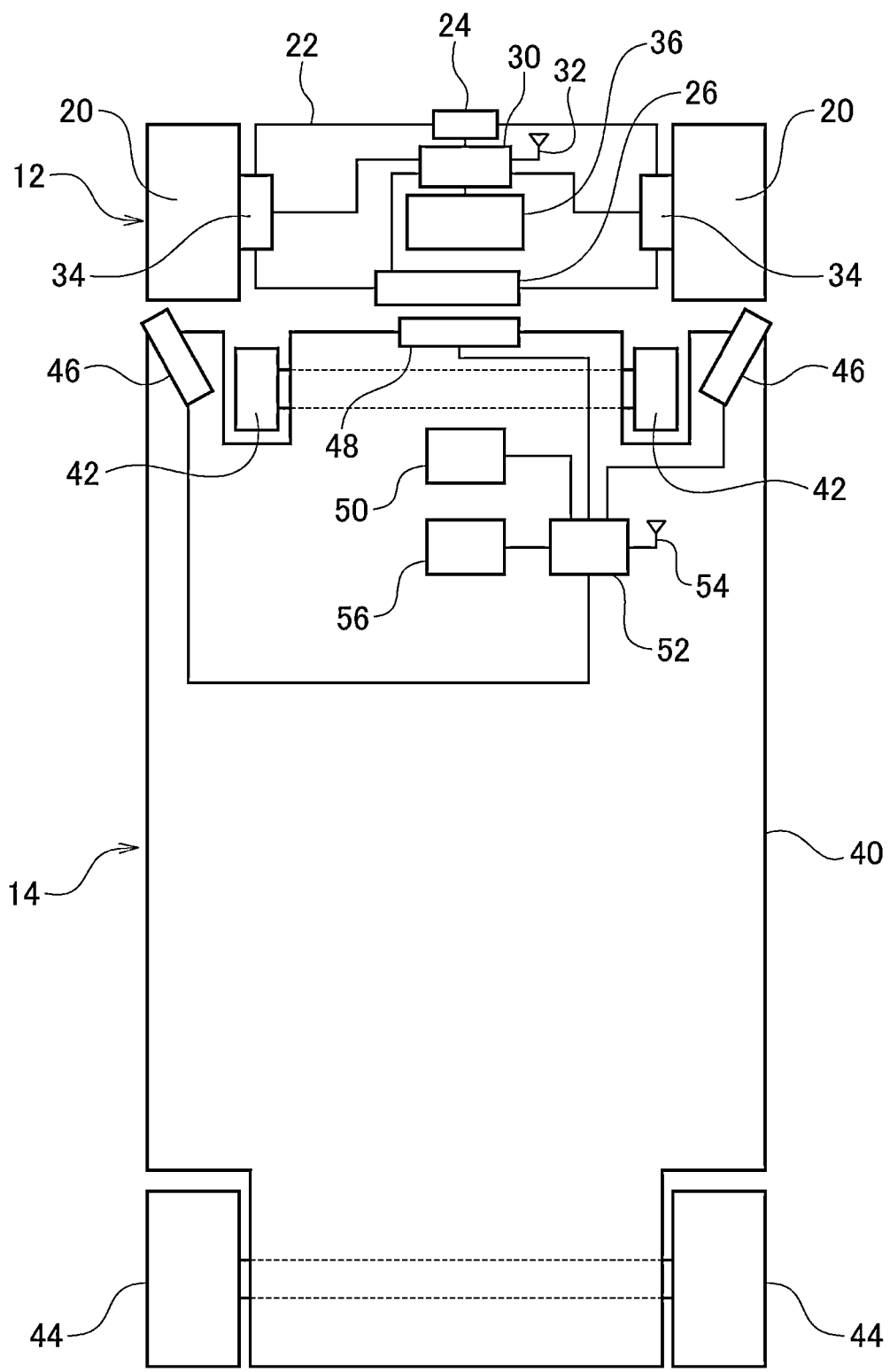
FIG. 5 is a diagram for explaining a configuration of the mobile body.

FIG. 5 is a diagram for explaining the configuration of the mobile body 10. The traveling unit 12 includes wheels 20, a main body portion 22, an object detection sensor 24, a connecting device 26, a processing device 30, a communication unit 32, a drive device 34, and a power supply device 36. The trolley unit 14 has the main body portion 40, the front wheels 42, the rear wheels 44, the leg portions 46, a connected portion 48, a power supply device 50, a processing device 52, a communication unit 54, and an object sensor 56.

In the traveling unit 12, a pair of the wheels 20 is provided in which one wheel is provided on the left side and the other wheel is provided on right side, and the wheels are rotatably supported by the main body portion 22. A drive device 34 is provided on each of the wheels 20. The drive device 34 includes a motor and rotates the wheels 20 in response to drive instructions generated by the processing device 30. Since the wheels 20 rotate independently of each other, the traveling unit 12 can bend right and left due to the difference in the rotation speed of the wheels 20. The main body portion 22 may be provided with one or more auxiliary wheels (not shown) in addition to the wheels 20.

The main body portion 22 is composed of a vehicle body frame and a cover that covers the internal structure. The object detection sensor 24 is provided on the main body portion 22 and detects an object in an advancing direction. The object detection sensor 24 may be a camera, a millimeter wave radar, an infrared laser, a sound wave sensor, or the like, or may be a combination thereof. The object detection sensor 24 may be provided not only at the front portion of the main body portion 22 but also at various locations of the main body portion 22 to detect an object in a rear or lateral direction. The object detection sensor 24 supplies the detection result to the processing device 30.

The connecting device 26 is provided at a rear portion of the main body portion 22 and is connected to the connected portion 48 (see FIG. 3) of the trolley unit 14. The processing device 30 controls the drive of the wheels 20 to connect the connecting device 26 and the connected portion 48 in a state where the traveling unit 12 and the trolley unit 14 are close to each other, and operates the locking mechanism to connect the connecting device 26 and the connected portion 48. When the connecting device 26 is coupled to the connected portion 48, the connecting device 26 sends a signal indicating that the connection is completed to the processing device 30. A lock mechanism for connecting the connecting device 26 and the connected portion 48 may have, for example, a structure that has a hook-shaped hook portion and that mechanically connects the connecting device 26 and the connected portion 48. However, the lock mechanism may also have a structure that electromagnetically connects the connecting device 26 and the connected portion 48. The processing device 30 separates the connecting device 26 and the connected portion 48 by releasing the lock mechanism.

The power supply device 36 is a rechargeable battery and supplies electric power to each configuration mounted on the traveling unit 12. The power supply device 36 may be capable of transmitting and receiving electric power to and from the power supply device 50 of the trolley unit 14. The processing device 30 monitors the amount of remaining power of the power supply device 36.

The processing device 30 controls autonomous traveling of the traveling unit 12. The processing device 30 drives the drive device 34 based on the detection result of the object detection sensor 24 and the location information of the traveling unit 12, and realizes autonomous traveling of the traveling unit 12. The communication unit 32 connects to the network 2 and communicates with the server device 6 and/or the trolley unit 14. When the distance between the traveling unit 12 and the trolley unit 14 is short, the communication unit 32 of the traveling unit 12 and the communication unit 54 of the trolley unit 14 may directly communicate with each other without going through the network 2.

In the trolley unit 14, the pair of front wheels 42 and the pair of rear wheels 44 are rotatably supported by the base portion 40a of the main body portion 40. The trolley unit 14 does not have a drive device for driving the front wheels 42 and the rear wheels 44. The connected portion 48 is provided in the front portion of the main body portion 40 and is connected to the connecting device 26 of the traveling unit 12. When the connecting device 26 and the connected portion 48 are connected, the connected portion 48 may send a signal indicating that the connection is completed to the processing device 52.

A pair of the leg portions 46 is provided on the front portion of the main body portion 40 and is configured to be able to advance and retreat with respect to the ground. When the leg portions 46 advance to the ground and come into contact with the ground, the leg portions 46 function as stoppers that limit the movement of the trolley unit 14. Thus, in a state where the trolley unit 14 is separated from the traveling unit 12, the leg portions 46 advance to the ground and come into contact with the ground to serve as the stoppers. On the other hand, when the trolley unit 14 is connected to the traveling unit 12, the leg portions 46 retract and are not in contact with the ground. For example, when the processing device 52 acquires a signal indicating that the connection is completed from the connected portion 48, the leg portions 46 may be retracted and separated from the ground.

The power supply device 50 uses at least one of hydrogen, gasoline, electricity, and the like as a power source, and supplies power to each configuration mounted on the trolley unit 14. FIG. 3 shows three hydrogen tanks inserted into three slots in a front part of the main body portion 40. The processing device 52 monitors the amount of remaining power of the power supply device 50.

The trolley unit 14 of the embodiment is used by placing an object on the housing portion 8. As will be described later, the object to be loaded may be various types of objects depending on the service to be provided, and the object sensor 56 acquires information for detecting the amount of the objects to be loaded on the housing portion 8. For example, the object sensor 56 may be a weight sensor and may measure the weight of an object placed on the housing portion 8. Further, the object sensor 56 may be an image sensor, and may acquire an image of an object placed on the housing portion 8. In this way, the object sensor 56 acquires information for detecting the amount of the objects present in the housing portion 8 and supplies the information to the processing device 52.

The communication unit 54 connects to the network 2 and communicates with the server device 6 and/or the traveling unit 12. When the distance between the traveling unit 12 and the trolley unit 14 is short, the communication unit 54 of the trolley unit 14 and the communication unit 32 of the traveling unit 12 may directly communicate with each other without going through the network 2.

Figure 6:
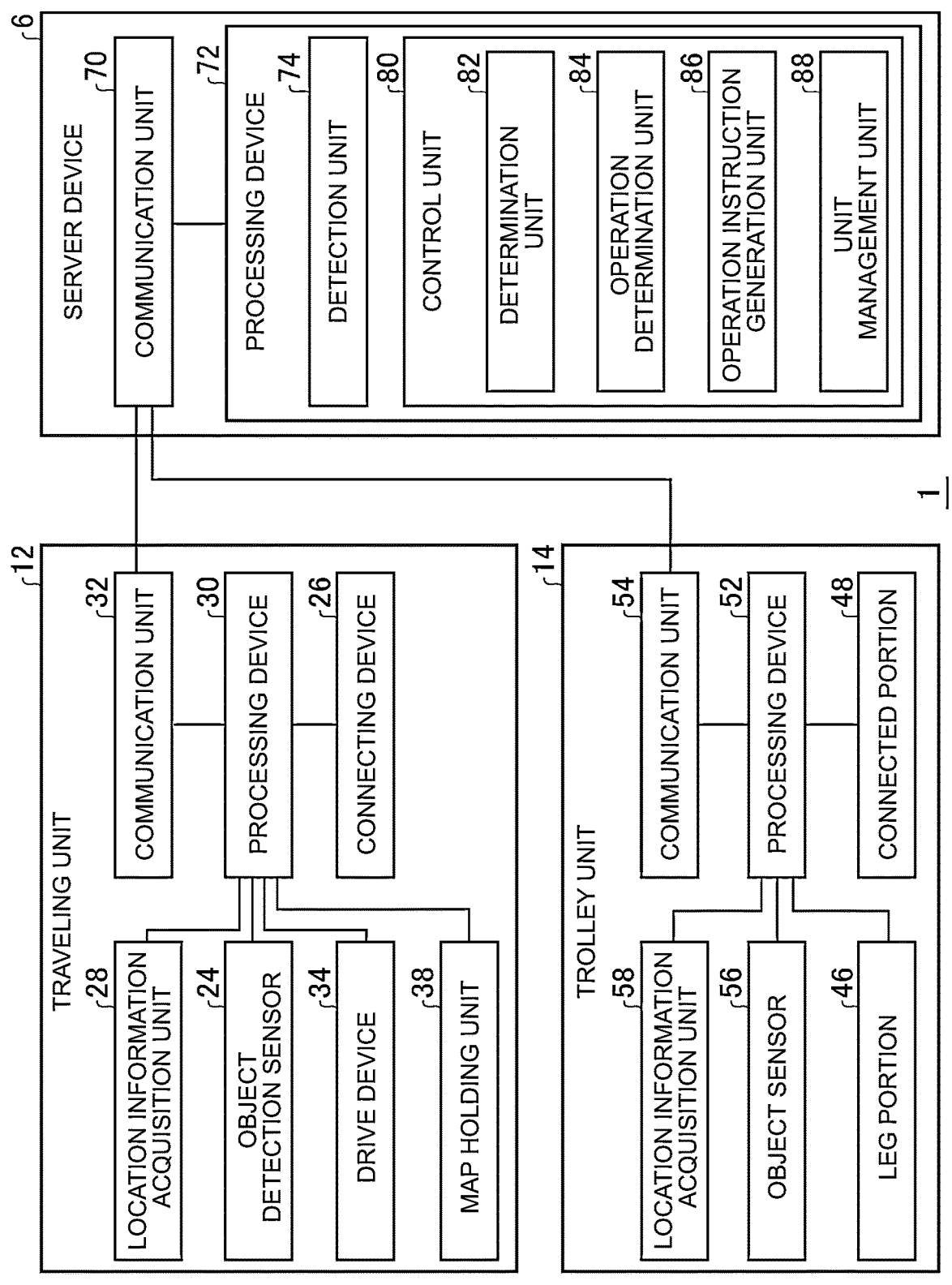
FIG. 6 is a diagram showing a functional block of the mobile body system.

FIG. 6 is a diagram showing a functional block of the mobile body system 1. The mobile body system 1 of the embodiment includes the traveling unit 12, the trolley unit 14, and the server device 6. Although one traveling unit 12 and one trolley unit 14 are shown in FIG. 6, a plurality of the traveling units 12 and a plurality of the trolley units 14 may be present in the mobile body system 1.

In the traveling unit 12, a location information acquisition unit 28 acquires the current location information of the traveling unit 12 by using a satellite positioning system, and supplies the acquired current location information to the processing device 30. For example, the location information acquisition unit 28 may be a global positioning system (GPS) receiver. The processing device 30 transmits the current location information of the traveling unit 12 from the communication unit 32 to the server device 6 together with identification information (traveling unit ID) of the traveling unit 12. It is preferable that the current location information be transmitted periodically.

A map holding unit 38 holds map information indicating a road location. The processing device 30 controls each configuration in the traveling unit 12 based on the operation instruction transmitted from the server device 6. The operation instruction includes at least information indicating a destination (destination). The processing device 30 derives a traveling route toward the destination included in the operation instruction by using the map information held in the map holding unit 38 and the current location information supplied from the location information acquisition unit 28. The processing device 30 controls the drive device 34 so as to travel along the derived travel route. The travel route may be derived by the server device 6 and included in the operation instruction. While traveling to the destination, the processing device 30 acquires information about objects present around the traveling unit 12 based on the detection data by the object detection sensor 24. The processing device 30 determines the advancing direction and the traveling speed so as to avoid a collision with a surrounding object, and drives the drive device 34.

In the trolley unit 14, the location information acquisition unit 58 acquires the current location information of the trolley unit 14 by using the satellite positioning system, and supplies the acquired current location information to the processing device 52. The location information acquisition unit 58 may be a GPS receiver. The processing device 52 transmits the current location information of the trolley unit 14 from the communication unit 54 to the server device 6 together with the identification information (trolley unit ID) of the trolley unit 14. It is preferable that the current location information be transmitted periodically.

The server device 6 includes a communication unit 70 and a processing device 72, and the processing device 72 has a detection unit 74 and a control unit 80. The control unit 80 includes a determination unit 82, an operation determination unit 84, an operation instruction generation unit 86, and a unit management unit 88.

The communication unit 70 receives the current location information from the traveling units 12 and the trolley units 14. The unit management unit 88 manages the current locations of the traveling units 12 and the trolley units 14 based on the current location information transmitted from the traveling units 12 and the trolley units 14.

In FIG. 6, each element described as a functional block that performs various processes can be configured by a circuit block, a memory, and other LSIs in terms of hardware, and is realized by a program loaded into the memory in terms of software. Thus, it is understood by those skilled in the art that these functional blocks can be realized in various forms such as hardware only, software only, or a combination thereof, and the present disclosure is not limited to any of them.

First Embodiment

Figure 7:
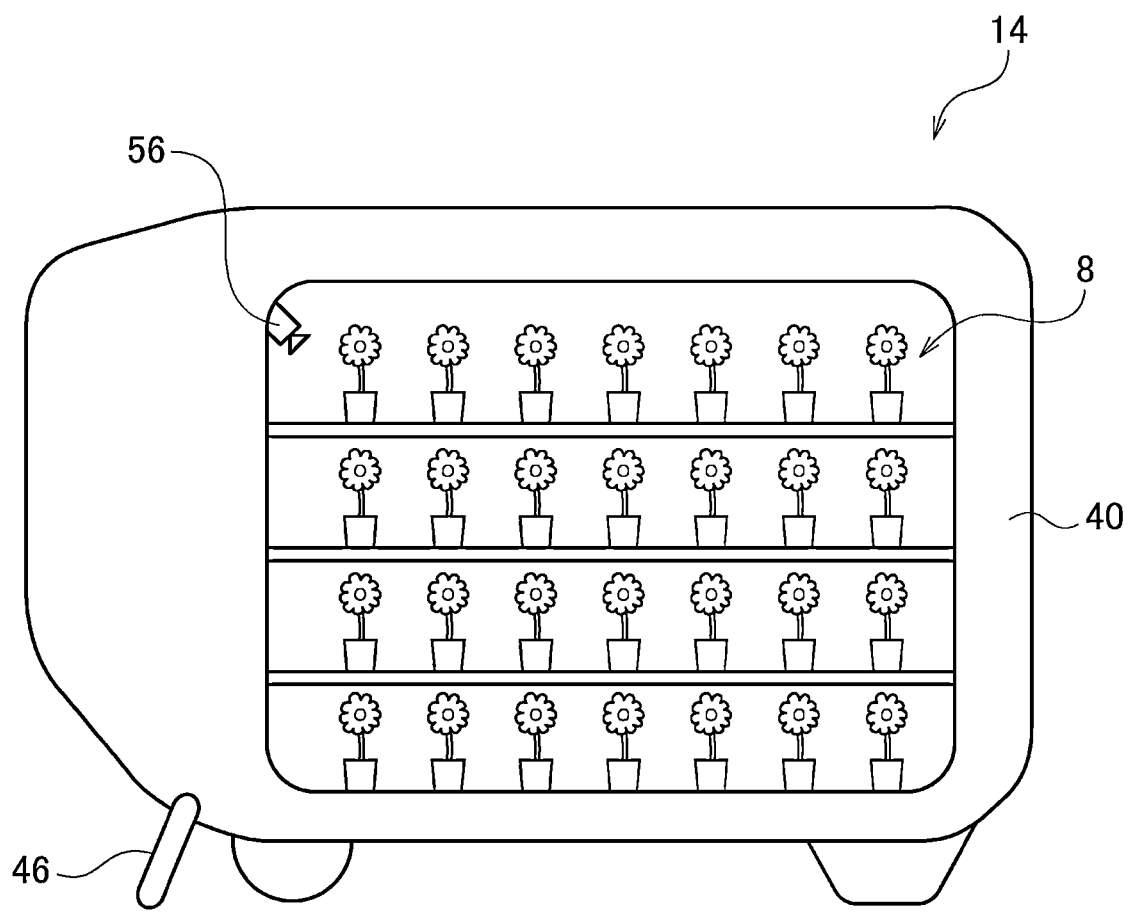
FIG. 7 is a diagram showing an example of the trolley unit.

In the first embodiment, the trolley unit 14 provides the store service. FIG. 7 shows an example of the trolley unit 14 for selling a product. The traveling unit 12 tows the trolley unit 14 to a sales location included in the operation instruction transmitted from the server device 6, and detaches the trolley unit 14 at the sales location. Before the trolley unit 14 is separated from the traveling unit 12, the processing device 52 makes the leg portions 46 come into contact with the ground to limit the movement of the trolley unit 14. The trolley unit 14 may be disposed in a place where people can easily gather, for example, in a corner of an office district.

In the trolley unit 14 shown in FIG. 7, a flower that is a product is placed on a product shelf provided in the housing portion 8. FIG. 7 shows a state before the start of sales. The housing portion 8 may be provided with a temperature adjusting function for maintaining the freshness of the flower. An electronic payment terminal (not shown) is provided in the main body portion 40, and a user can purchase a product and take it home by making an electronic payment. In this example, only one trolley unit 14 is shown. However, the trolley units 14 carrying various types of products may be disposed side by side in the same space. The product mounted on the trolley unit 14 may be, for example, clothes, food, beverages, books, and the like, other than flowers. By disposing the trolley units 14 carrying various types of products in the same space, a temporary shopping center can be constructed, and the user can search for and purchase what they want.

The object sensor 56 acquires information for detecting the amount of objects (commodities) placed in the housing portion 8. In the example shown in FIG. 7, the object sensor 56 is an image sensor that acquires image information acquired by photographing the inside of the housing portion 8. However, the object sensor 56 may be a weight sensor that acquires weight information of an object (product) placed on a product shelf. The sensor information acquired by the object sensor 56 is supplied to the processing device 52, and while the store service is being provided, the processing device 52 periodically transmits the sensor information acquired by the object sensor 56 together with the trolley unit ID from the communication unit 54 to the server device 6. If the processing device 52 has a function of detecting that the remaining amount of products has changed, that is, that the product placed on the product shelf has been brought back by the user, at that timing, the sensor information acquired by the object sensor 56 may be transmitted from the communication unit 54 to the server device 6.

When all the products in the trolley unit 14 are purchased by the user, the trolley unit 14 has no meaning to be present in the sales location. Therefore, when the remaining amount of products is low, it is preferable that the trolley unit 14 is moved from the sales location, and instead, another trolley unit 14 full of products is disposed at the sales location.

Figure 8:
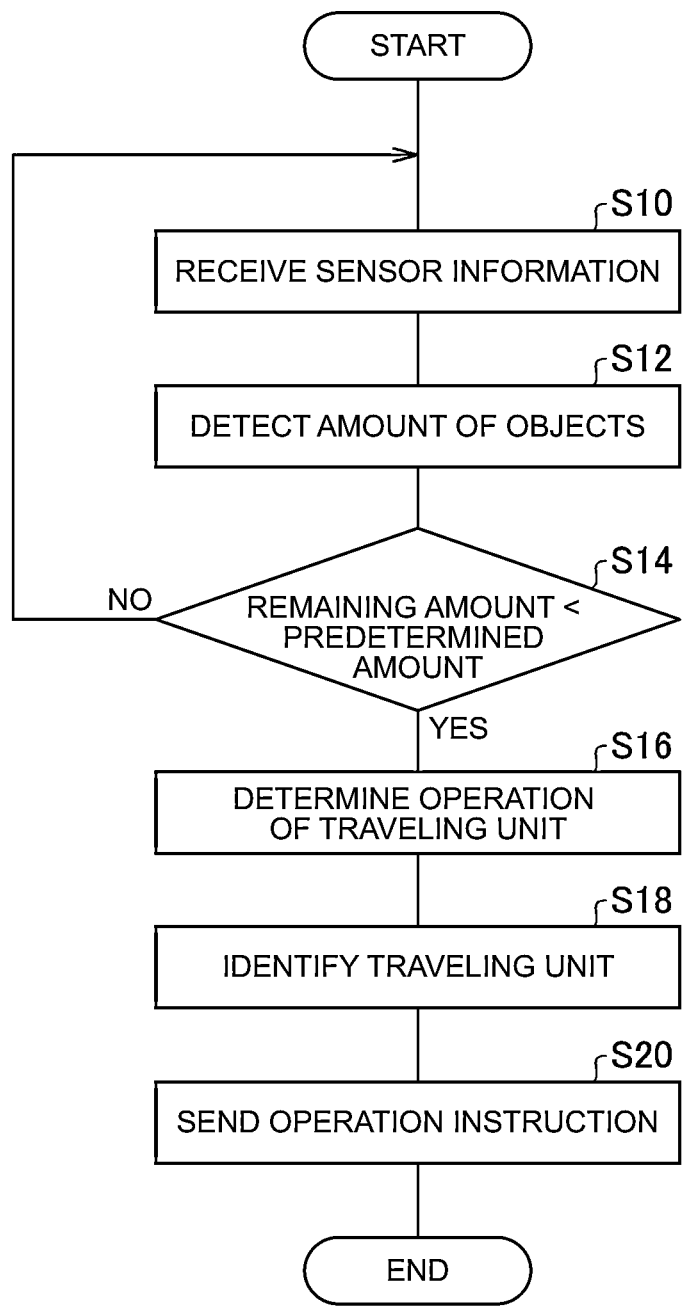
FIG. 8 is a diagram showing a flowchart of a process in a server device.

FIG. 8 shows a flowchart of a process in the server device 6. In the server device 6, the communication unit 70 receives the sensor information acquired by the object sensor 56 in the trolley unit 14 (S10). The detection unit 74 detects the amount (remaining amount) of objects placed on the housing portion 8 from the sensor information acquired by the object sensor 56 (S12). The amount of the object to be detected may be the number of objects or the weight of the object.

The case where the sensor information acquired by the object sensor 56 is the image information acquired by photographing the housing portion 8 will be described. The detection unit 74 has an image recognition function and detects the number of products from the image information. For example, the detection unit 74 detects that the number of products is 28 from the image information acquired by photographing the housing portion 8 at the start of sales shown in FIG. 7.

The determination unit 82 determines whether the amount of products detected by the detection unit 74 is less than a predetermined amount (S14). Here, the predetermined amount serving as the threshold value may be, for example, six. At the start of sales, 28 products are loaded on the housing portion 8, and thus, the determination unit 82 determines that the amount of products is not less than the predetermined amount at the start of sales (N in S14).

Figure 9:
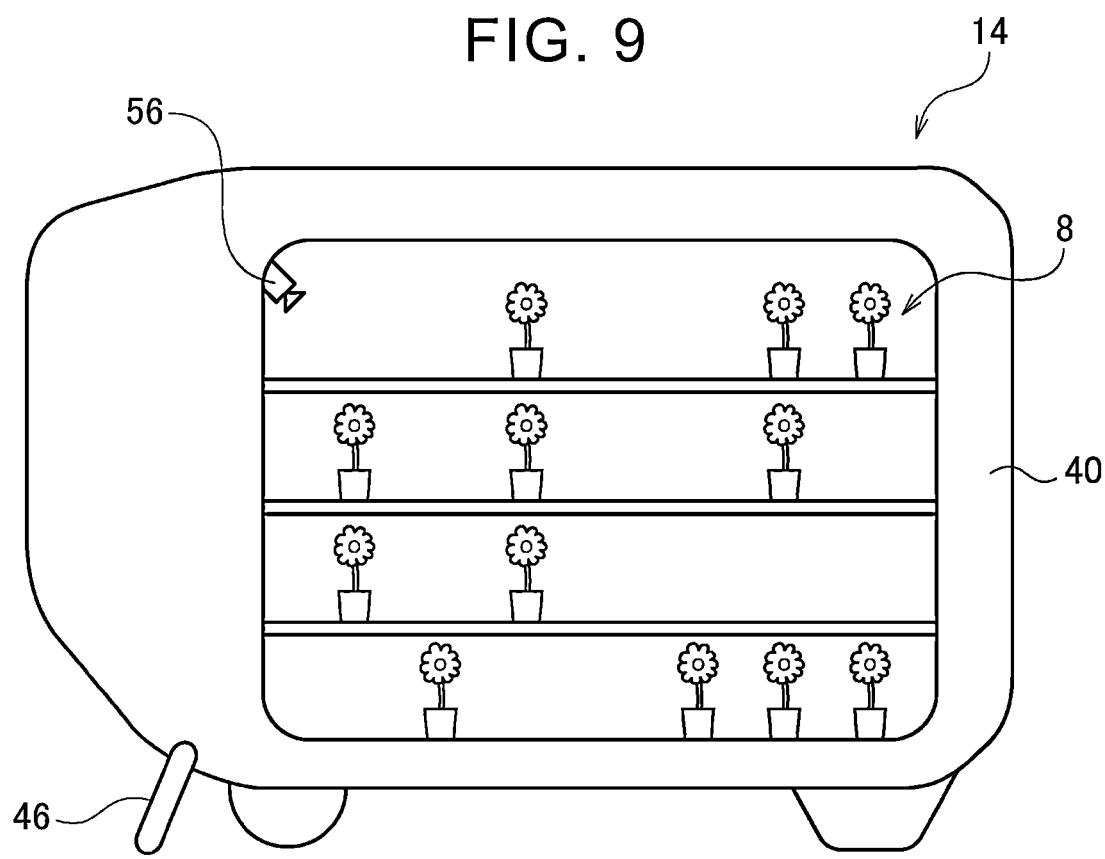
FIG. 9 is a diagram showing an example of a housing portion.

FIG. 9 shows an example of the state of the housing portion 8. In this example, after the start of sales, a plurality of products is purchased and the purchased products are removed from the product shelves. The detection unit 74 detects that the number of remaining products is 12 from the image information acquired by photographing the housing portion 8 shown in FIG. 9 (S12). At this time, the determination unit 82 determines that the amount of products is not less than the predetermined amount (N in S14).

Figure 10:
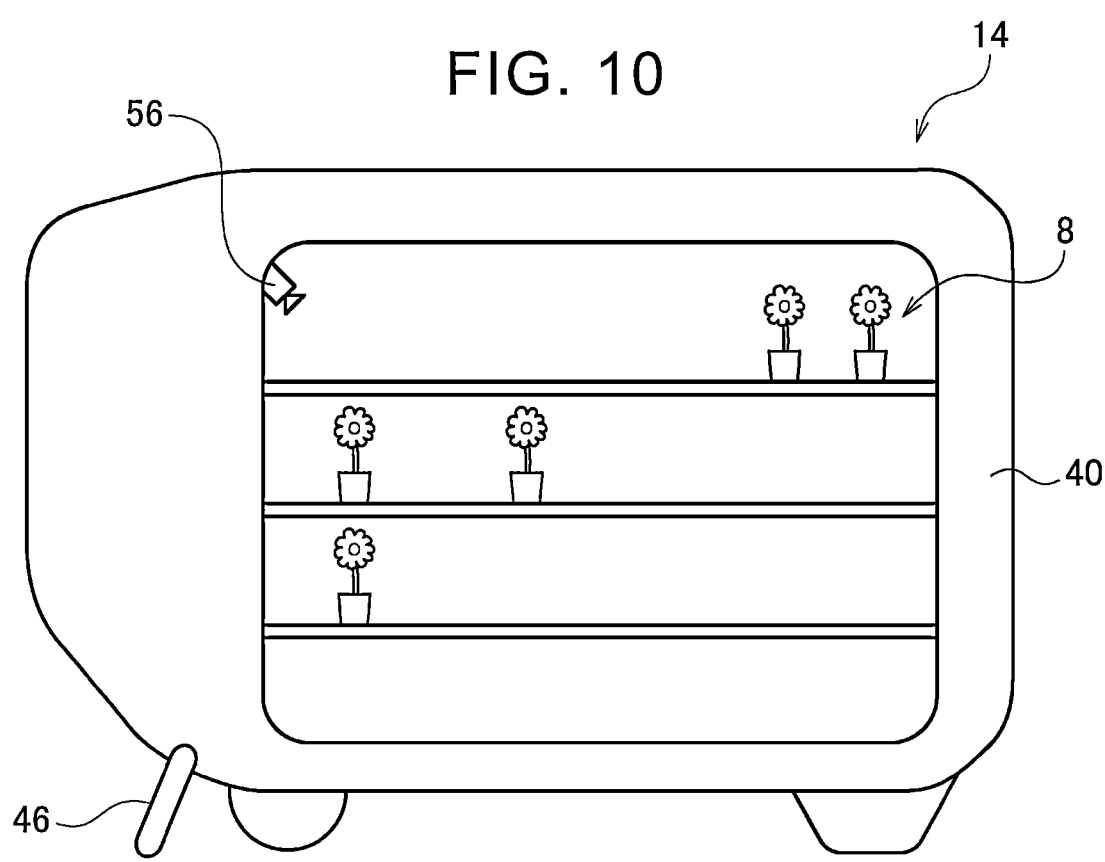
FIG. 10 is a diagram showing another example of the state of the housing portion.

FIG. 10 shows another example of the state of the housing portion 8. In this example, a plurality of products is further purchased from the state shown in FIG. 9. The detection unit 74 detects that the number of remaining products is five from the image information acquired by photographing the housing portion 8 shown in FIG. 10 (S12). At this time, the determination unit 82 determines that the amount of products is less than the predetermined amount (six products) (Y in S14).

The operation determination unit 84 determines the operation of the traveling unit 12 when the remaining amount of products falls below a predetermined amount (S16). Here, the operation determination unit 84 determines an operation of collecting the trolley unit 14 in which the remaining amount of products is less than the predetermined amount. This recovery operation is an operation in which the traveling unit 12 moves to the location of the trolley unit 14, connects to the trolley unit 14, and tows the trolley unit 14 to a predetermined collection place. The predetermined collection place that is a towing destination may be, for example, a place for replenishing products.

The unit management unit 88 identifies the traveling unit 12 to which an operation (task) is not assigned among the traveling units 12 present around the trolley unit 14 (S18). The unit management unit 88 notifies the operation instruction generation unit 86 of the traveling unit ID of the identified traveling unit 12 and the current location information of the trolley unit 14 that is a collection target. The operation instruction generation unit 86 generates an instruction to move to the location of the trolley unit 14, connect with the trolley unit 14, and tow the trolley unit 14 to a predetermined collection place. The operation instruction generation unit 86 transmits an operation instruction including the current location information of the trolley unit 14 that is the collection target from the communication unit 70 to the traveling unit 12 having the notified traveling unit ID (S20).

In the traveling unit 12 having the traveling unit ID, the communication unit 32 receives the operation instruction. The processing device 30 uses the map information held in the map holding unit 38 and the current location information of the traveling unit 12 supplied from the location information acquisition unit 28 based on the operation instruction so as to derive the travel route toward the destination (the current location of the trolley unit 14) included in the operation instruction. While traveling to the destination, the processing device 30 determines the advancing direction and the traveling speed along the traveling route so as to avoid colliding with surrounding objects based on the detection data by the object detection sensor 24, and controls driving of the drive device 34.

When the traveling unit 12 moves to the location of the trolley unit 14 that is the collection target, in a state where the traveling unit 12 and the trolley unit 14 are close to each other, the processing device 30 controls the drive of the wheels 20 and connects the connecting device 26 and the connected portion 48, operates the lock mechanism, and connects the connecting device 26 and the connected portion 48. When the connecting device 26 is coupled to the connected portion 48, the connecting device 26 sends a signal indicating that the connection is completed to the processing device 30.

In the trolley unit 14, when the connected portion 48 is connected to the connecting device 26, the connected portion 48 sends a signal indicating that the connection is completed to the processing device 52. When the processing device 52 acquires the signal indicating that the connection is completed from the connected portion 48, the processing device 52 retracts the leg portions 46 and separates them from the ground.

After that, the processing device 30 of the traveling unit 12 uses the map information held by the map holding unit 38 and the current location information of the traveling unit 12 supplied from the location information acquisition unit 28 and derives the traveling route toward the destination (the collection place of the trolley unit 14) included in the operation instruction. The processing device 30 controls the drive of the drive device 34 so as to travel along the travel route. When the traveling unit 12 moves to the collection place of the trolley unit 14, the processing device 30 notifies the trolley unit 14 that it has arrived at the destination. In the trolley unit 14, the processing device 52 receives this notification and makes the leg portions 46 come into contact with the ground.

After that, the processing device 30 releases the lock mechanism that connects the connecting device 26 and the connected portion 48. When the processing device 30 completes the operation (task) in accordance with the operation instruction transmitted from the server device 6, the processing device 30 notifies the server device 6 of the completion of the task. In the server device 6, the unit management unit 88 receives this notification and manages the traveling unit 12 as a traveling unit to which an operation (task) is not assigned.

In the first embodiment described above, in S16, the operation determination unit 84 determines a collection operation in which the traveling unit 12 moves to the location of the trolley unit 14, connects with the trolley unit 14, and tows the trolley unit 14 to the predetermined collection place. In another example, the traveling unit 12 may tow another trolley unit 14 on which the product is placed to the location of the trolley unit 14 that is the collection target, and perform an operation of exchanging the trolley unit 14 at that location.

That is, in another example, in S18, the unit management unit 88 identifies the traveling unit 12 to which the operation (task) is not assigned and that is the traveling unit 12 that is connected to the trolley unit 14 on which the product is loaded, among the traveling units 12 present around the trolley unit 14 that is the collection target. The unit management unit 88 notifies the operation instruction generation unit 86 of the traveling unit ID of the identified traveling unit 12 and the current location information of the trolley unit 14 that is the collection target. In S20, the operation instruction generation unit 86 generates the operation instruction to tow the trolley unit 14 on which the product is loaded to the location of the trolley unit 14 that is the collection target, separate from the trolley unit 14 on which the product is loaded, and then connect to the trolley unit 14 that is the collection target to tow the trolley unit 14 to the predetermined collection place. The operation instruction generation unit 86 transmits the operation instruction including the current location information of the trolley unit 14 that is the collection target from the communication unit 70 to the traveling unit 12 having the notified traveling unit ID.

In the traveling unit 12 having the traveling unit ID, the communication unit 32 receives the operation instruction. The processing device 30 uses the map information held in the map holding unit 38 and the current location information of the traveling unit 12 supplied from the location information acquisition unit 28 based on the operation instruction so as to derive the travel route toward the destination (the current location of the trolley unit 14 that is the collection target) included in the operation instruction. The processing device 30 controls the drive of the drive device 34 so as to travel along the travel route.

When the traveling unit 12 moves to the location of the trolley unit 14 that is the collection target, the processing device 30 notifies the trolley unit 14 on which the product is loaded that the product has arrived at the destination. In the trolley unit 14 on which the product is loaded, the processing device 52 receives this notification and makes the leg portions 46 come into contact with the ground.

After that, the processing device 30 releases the lock mechanism that connects the connecting device 26 and the connected portion 48 of the trolley unit 14 on which the product is loaded. Then, the processing device 30 brings the traveling unit 12 close to the trolley unit 14 that is the collection target, connects the connecting device 26 and the connected portion 48, and operates the lock mechanism to connect the connecting device 26 to the connected portion 48. When the connecting device 26 is coupled to the connected portion 48, the connecting device 26 sends a signal indicating that the connection is completed to the processing device 30.

In the trolley unit 14 that is the collection target, when the connected portion 48 is connected to the connecting device 26, the connected portion 48 sends a signal indicating that the connection is completed to the processing device 52. When the processing device 52 acquires the signal indicating that the connection is completed from the connected portion 48, the processing device 52 retracts the leg portions 46 and separates them from the ground.

After that, the processing device 30 of the traveling unit 12 uses the map information held by the map holding unit 38 and the current location information of the traveling unit 12 supplied from the location information acquisition unit 28 and derives the traveling route toward the destination (the collection place of the trolley unit 14) included in the operation instruction. The processing device 30 controls the drive of the drive device 34 so as to travel along the travel route. When the traveling unit 12 moves to the collection place of the trolley unit 14, the processing device 30 notifies the trolley unit 14 that it has arrived at the destination. In the trolley unit 14, the processing device 52 receives this notification and makes the leg portions 46 come into contact with the ground.

After that, the processing device 30 releases the lock mechanism that connects the connecting device 26 and the connected portion 48. When the processing device 30 completes the operation (task) in accordance with the operation instruction transmitted from the server device 6, the processing device 30 notifies the server device 6 of the completion of the task. In the server device 6, the unit management unit 88 receives this notification and manages the traveling unit 12 as a traveling unit to which an operation (task) is not assigned.

A case will be described in which in S18, the unit management unit 88 cannot identify the traveling unit 12 to which the operation (task) is not assigned and that is connected to the trolley unit 14 on which the product is loaded, among the traveling units 12 present around the trolley unit 14 that is the collection target. At this time, the unit management unit 88 notifies the operation instruction generation unit 86 of the above situation, and notifies the operation instruction generation unit 86 of the traveling unit ID of the traveling unit 12 to which an operation (task) is not assigned among the traveling units 12 present around the trolley unit 14 that is the collection target.

When the operation instruction generation unit 86 receives this notification, the operation instruction generation unit 86 generates the operation instruction to connect to the trolley unit 14 on which the product is loaded, tow the trolley unit 14 to the location of the trolley unit 14 that is the collection target, separate from the trolley unit 14 on which the product is loaded, and then connect to the trolley unit 14 that is the collection target to tow the trolley unit 14 to the predetermined collection place. The operation instruction generation unit 86 transmits the current location information of the trolley unit 14 on which the product is loaded and the operation instruction including the current location information of the trolley unit 14 that is the collection target from the communication unit 70 to the traveling unit 12 having the notified traveling unit ID.

In the first embodiment, the control unit 80 in the server device 6 generates to the traveling unit 12, the operation instruction to collect the trolley unit 14 at the timing when the remaining amount of products in the trolley unit 14 becomes less than a predetermined amount. In another example, the control unit 80 may monitor the remaining amount of products in the trolley unit 14 to determine whether the products are selling well. For example, when the trolley units 14 carrying the same products are disposed at different places, the control unit 80 may generate an operation instruction to move the trolley unit 14 in which the products are not selling well to the location where the trolley unit 14 in which the products are selling well is disposed, and transmit the generated operation instruction to the traveling unit 12.

In the first embodiment, the case where the product to be loaded on the housing portion 8 is a flower has been described. However, the product may be clothes, hats, shoes, gloves, and the like. At this time, the main body portion 40 of the trolley unit 14 may be equipped with a virtual fitting system that the user can try on with augmented reality (AR). Further, in the first embodiment, it is assumed that the user brings back the purchased product. However, for example, the traveling unit 12 may carry the purchased product to the user's home.

Further, in the first embodiment, the case where the object to be placed on the housing portion 8 is a product intended to be sold has been described. However, the object may be relief supplies such as water and food that are not intended to be sold. Since the trolley unit 14 is equipped with the power supply device 50, the electric power of the power supply device 50 may be used by disposing the trolley unit 14 in an area where a disaster has occurred, for example.

Further, in the first embodiment, an example is shown in which the trolley unit 14 is disposed in a corner of an office district. However, the trolley unit 14 may be used for selling fresh food in a marginal village, for example. Further, the trolley unit 14 may be disposed at an event holding place by loading a vending machine on the housing portion 8.

Second Embodiment

In a second embodiment, the trolley unit 14 provides a garbage collection service.

Figure 11:
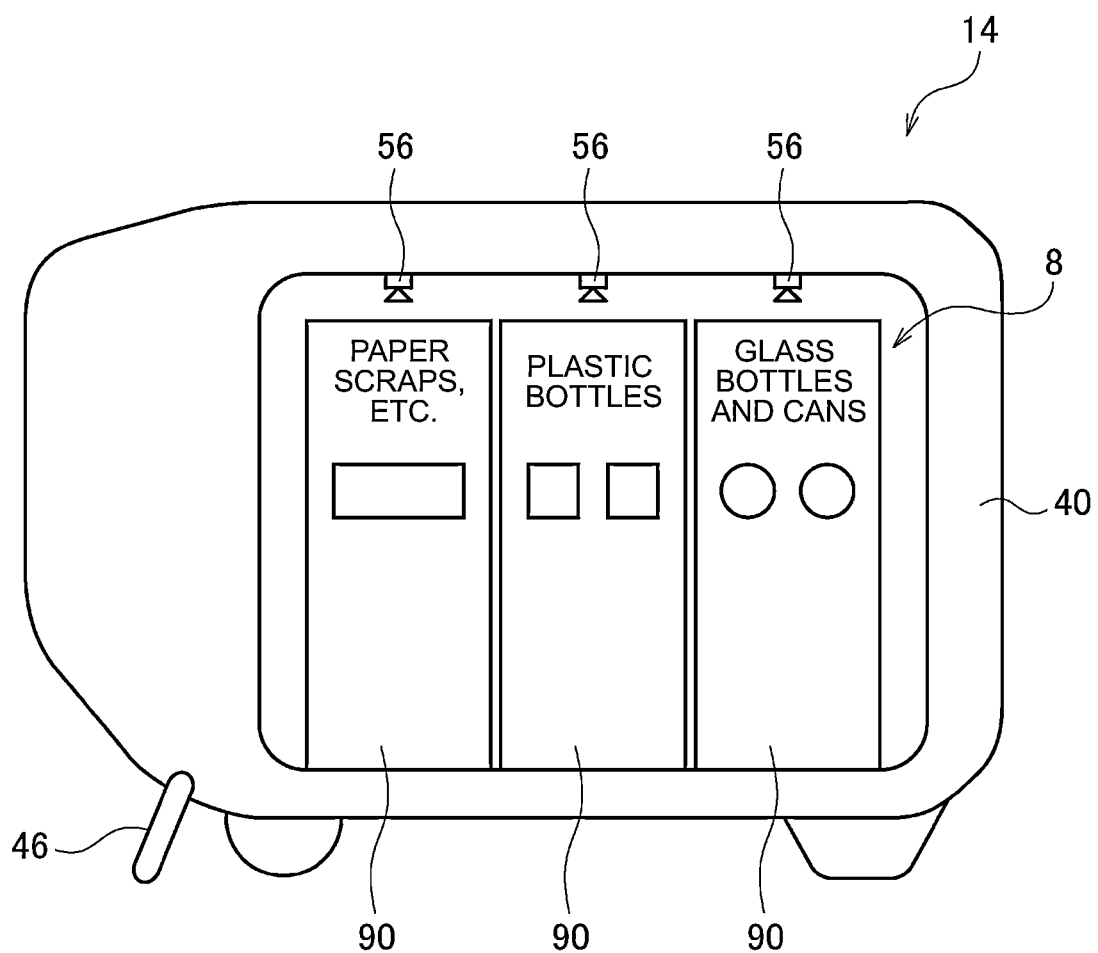
FIG. 11 is a diagram showing an example of the trolley unit.

FIG. 11 shows an example of a trolley unit 14 that collects garbage. The traveling unit 12 tows the trolley unit 14 to the garbage collection location included in the operation instruction transmitted from the server device 6, and detaches the trolley unit 14 at the garbage collection location. Before the trolley unit 14 is separated from the traveling unit 12, the processing device 52 makes the leg portions 46 come into contact with the ground to limit the movement of the trolley unit 14. The trolley unit 14 may be disposed in a place where garbage is likely to be generated, for example, in a corner of a park.

The trolley unit 14 shown in FIG. 11 has a plurality of the garbage cans 90 for putting in garbage in the housing portion 8. The object sensor 56 acquires information for detecting the amount of objects (garbage) put into the garbage can 90. In the example shown in FIG. 11, the object sensor 56 is an image sensor that acquires image information in which the inside of the garbage can 90 disposed in the housing portion 8 is captured. However, the object sensor 56 may be a weight sensor that acquires weight information of an object (garbage) put in the garbage can 90. The sensor information acquired by the object sensor 56 is supplied to the processing device 52, and while the garbage collection service is being provided, the processing device 52 periodically transmits the sensor information acquired by the object sensor 56 together with the trolley unit ID from the communication unit 54 to the server device 6. If the processing device 52 has a function of detecting that the amount of objects has changed, that is, that garbage has been put into the garbage can 90, at that timing, the sensor information acquired by the object sensor 56 may be transmitted from the communication unit 54 to the server device 6.

When the garbage can 90 in the trolley unit 14 is full of garbage, it is meaningless that the trolley unit 14 is present at the garbage collection location. Therefore, when the amount of accumulated garbage increases, it is preferable that the trolley unit 14 be moved from the garbage collection location and that another trolley unit 14 equipped with the empty garbage can 90 be disposed at the garbage collection location instead.

FIG. 12 shows a flowchart of a process in the server device 6. In the server device 6, the communication unit 70 receives the sensor information acquired by the object sensor 56 in the trolley unit 14 (S30). The detection unit 74 detects the amount (accumulated amount) of the object placed on the housing portion 8 from the sensor information acquired by the object sensor 56 (S32). The amount of the object to be detected may be the volume of the object or the weight of the object.

The case where the sensor information acquired by the object sensor 56 is the image information acquired by photographing the housing portion 8 will be described. The detection unit 74 has an image recognition function and detects the amount of garbage from the image information. Here, the detection unit 74 may detect the amount of garbage put into the garbage can 90 by detecting the empty volume of the garbage can 90 from the image information.

The determination unit 82 determines whether the amount of garbage detected by the detection unit 74 exceeds a predetermined amount (S34). Here, the predetermined amount serving as a threshold value may be, for example, the amount of garbage accumulated up to the height of a garbage inlet. When the height at which the garbage is accumulated is less than the height of the garbage input port, the determination unit 82 determines that the accumulated garbage does not exceed the predetermined amount (N in S34).

In contrast, when the height at which the garbage is accumulated reaches the height of the garbage input port, the determination unit 82 determines that the accumulated amount of garbage exceeds a predetermined amount (Y in S34). When the accumulated amount of garbage exceeds the predetermined amount, the operation determination unit 84 determines the operation of the traveling unit 12 (S36). Here, the operation determination unit 84 determines an operation of collecting the trolley unit 14 in which the amount of accumulated garbage exceeds the predetermined amount. This recovery operation is an operation in which the traveling unit 12 moves to the location of the trolley unit 14, connects to the trolley unit 14, and tows the trolley unit 14 to a predetermined collection place. The predetermined collection place that is the towing destination may be, for example, a facility for processing garbage.

The unit management unit 88 identifies the traveling unit 12 to which an operation (task) is not assigned among the traveling units 12 present around the trolley unit 14 (S38). The unit management unit 88 notifies the operation instruction generation unit 86 of the traveling unit ID of the identified traveling unit 12 and the current location information of the trolley unit 14 that is a collection target. The operation instruction generation unit 86 generates an instruction to move to the location of the trolley unit 14, connect with the trolley unit 14, and tow the trolley unit 14 to a predetermined collection place. The operation instruction generation unit 86 transmits an operation instruction including the current location information of the trolley unit 14 that is the collection target from the communication unit 70 to the traveling unit 12 having the notified traveling unit ID (S40).

In the traveling unit 12 having the traveling unit ID, the communication unit 32 receives the operation instruction. The processing device 30 uses the map information held in the map holding unit 38 and the current location information of the traveling unit 12 supplied from the location information acquisition unit 28 based on the operation instruction so as to derive the travel route toward the destination (the current location of the trolley unit 14) included in the operation instruction. The processing device 30 controls the drive of the drive device 34 so as to travel along the travel route.

When the traveling unit 12 moves to the location of the trolley unit 14 that is the collection target, in a state where the traveling unit 12 and the trolley unit 14 are close to each other, the processing device 30 controls the drive of the wheels 20 and connects the connecting device 26 and the connected portion 48, operates the lock mechanism, and connects the connecting device 26 and the connected portion 48. When the connecting device 26 is coupled to the connected portion 48, the connecting device 26 sends a signal indicating that the connection is completed to the processing device 30.

In the trolley unit 14, when the connected portion 48 is connected to the connecting device 26, the connected portion 48 sends a signal indicating that the connection is completed to the processing device 52. When the processing device 52 acquires the signal indicating that the connection is completed from the connected portion 48, the processing device 52 retracts the leg portions 46 and separates them from the ground.

After that, the processing device 30 of the traveling unit 12 uses the map information held by the map holding unit 38 and the current location information of the traveling unit 12 supplied from the location information acquisition unit 28 and derives the traveling route toward the destination (the collection place of the trolley unit 14) included in the operation instruction. The processing device 30 controls the drive of the drive device 34 so as to travel along the travel route. When the traveling unit 12 moves to the collection place of the trolley unit 14, the processing device 30 notifies the trolley unit 14 that it has arrived at the destination. In the trolley unit 14, the processing device 52 receives this notification and makes the leg portions 46 come into contact with the ground.

After that, the processing device 30 releases the lock mechanism that connects the connecting device 26 and the connected portion 48. When the processing device 30 completes the operation (task) in accordance with the operation instruction transmitted from the server device 6, the processing device 30 notifies the server device 6 of the completion of the task. In the server device 6, the unit management unit 88 receives this notification and manages the traveling unit 12 as a traveling unit to which an operation (task) is not assigned.

In the second embodiment described above, in S36, the operation determination unit 84 determines a collection operation in which the traveling unit 12 moves to the location of the trolley unit 14, connects with the trolley unit 14, and tows the trolley unit 14 to the predetermined collection place. In another example, the traveling unit 12 may tow another trolley unit 14 on which the empty garbage can 90 is placed to the location of the trolley unit 14 that is the collection target, and perform an operation of exchanging the trolley unit 14 at that location.

That is, in another example, in S38, the unit management unit 88 identifies the traveling unit 12 to which the operation (task) is not assigned and that is connected to the trolley unit 14 on which the empty garbage can 90 is loaded, among the traveling units 12 present around the trolley unit 14 that is the collection target. The unit management unit 88 notifies the operation instruction generation unit 86 of the traveling unit ID of the identified traveling unit 12 and the current location information of the trolley unit 14 that is a collection target. In S40, the operation instruction generation unit 86 generates the operation instruction to tow the trolley unit 14 on which the empty garbage can 90 is loaded to the location of the trolley unit 14 that is the collection target, separate from the trolley unit 14 on which the product is loaded, and then connect to the trolley unit 14 that is the collection target to tow the trolley unit 14 to the predetermined collection place. The operation instruction generation unit 86 transmits the operation instruction including the current location information of the trolley unit 14 that is the collection target from the communication unit 70 to the traveling unit 12 having the notified traveling unit ID.

In the traveling unit 12 having the traveling unit ID, the communication unit 32 receives the operation instruction. The processing device 30 uses the map information held in the map holding unit 38 and the current location information of the traveling unit 12 supplied from the location information acquisition unit 28 based on the operation instruction so as to derive the travel route toward the destination (the current location of the trolley unit 14 that is the collection target) included in the operation instruction. The processing device 30 controls the drive of the drive device 34 so as to travel along the travel route.

When the traveling unit 12 moves to the location of the trolley unit 14 that is the collection target, the processing device 30 notifies the trolley unit 14 on which the product is loaded that the empty garbage can 90 has arrived at the destination. In the trolley unit 14 on which the empty garbage can 90 is loaded, the processing device 52 receives this notification and makes the leg portions 46 come into contact with the ground.

After that, the processing device 30 releases the lock mechanism that connects the connecting device 26 and the connected portion 48 of the trolley unit 14 on which the empty garbage can 90 is loaded. Then, the processing device 30 brings the traveling unit 12 close to the trolley unit 14 that is the collection target, connects the connecting device 26 and the connected portion 48, and operates the lock mechanism to connect the connecting device 26 to the connected portion 48. When the connecting device 26 is coupled to the connected portion 48, the connecting device 26 sends a signal indicating that the connection is completed to the processing device 30.

In the trolley unit 14 that is the collection target, when the connected portion 48 is connected to the connecting device 26, the connected portion 48 sends a signal indicating that the connection is completed to the processing device 52. When the processing device 52 acquires the signal indicating that the connection is completed from the connected portion 48, the processing device 52 retracts the leg portions 46 and separates them from the ground.

After that, the processing device 30 of the traveling unit 12 uses the map information held by the map holding unit 38 and the current location information of the traveling unit 12 supplied from the location information acquisition unit 28 and derives the traveling route toward the destination (the collection place of the trolley unit 14) included in the operation instruction. The processing device 30 controls the drive of the drive device 34 so as to travel along the travel route. When the traveling unit 12 moves to the collection place of the trolley unit 14, the processing device 30 notifies the trolley unit 14 that it has arrived at the destination. In the trolley unit 14, the processing device 52 receives this notification and makes the leg portions 46 come into contact with the ground.

After that, the processing device 30 releases the lock mechanism that connects the connecting device 26 and the connected portion 48. When the processing device 30 completes the operation (task) in accordance with the operation instruction transmitted from the server device 6, the processing device 30 notifies the server device 6 of the completion of the task. In the server device 6, the unit management unit 88 receives this notification and manages the traveling unit 12 as a traveling unit to which an operation (task) is not assigned.

A case will be described in which in S38, the unit management unit 88 cannot identify the traveling unit 12 to which the operation (task) is not assigned and that is connected to the trolley unit 14 on which an empty garbage can 90 is loaded, among the traveling units 12 present around the trolley unit 14 that is the collection target. At this time, the unit management unit 88 notifies the operation instruction generation unit 86 of the above situation, and notifies the operation instruction generation unit 86 of the traveling unit ID of the traveling unit 12 to which an operation (task) is not assigned among the traveling units 12 present around the trolley unit 14 that is the collection target.

When the operation instruction generation unit 86 receives this notification, the operation instruction generation unit 86 generates the operation instruction to connect to the trolley unit 14 on which the empty garbage can 90 is loaded, tow the trolley unit 14 to the location of the trolley unit 14 that is the collection target, separate from the trolley unit 14 on which the empty garbage can 90 is loaded, and then connect to the trolley unit 14 that is the collection target to tow the trolley unit 14 to the predetermined collection place. The operation instruction generation unit 86 transmits the current location information of the trolley unit 14 on which the empty garbage can 90 is loaded and the operation instruction including the current location information of the trolley unit 14 that is the collection target from the communication unit 70 to the traveling unit 12 having the notified traveling unit ID.

In the second embodiment, the case where the object to be loaded on the housing portion 8 is garbage has been described. However, the object to be loaded may be a home electric appliance that is to be recycled. Further, in the second embodiment, the example in which the trolley unit 14 is disposed in a corner of the park is shown. However, the trolley unit 14 may be disposed in the event holding place.

The present disclosure has been described above based on some embodiments. This embodiment is an example, and it is understood by those skilled in the art that various modifications are possible for combinations of each of these components and of each of these processing processes, and that such modifications are also within the scope of the present disclosure. In the embodiment, it is assumed that the traveling unit 12 and the trolley unit 14 are configured to be connectable and separable. However, the traveling unit 12 and the trolley unit 14 may be configured to be inseparable.

In the embodiment, the server device 6 includes the processing device 72. However, in a modified example, the traveling unit 12 may have the function of the processing device 72 in the server device 6.

In the first embodiment, the trolley unit 14 provides the store service. However, for example, a projector may be mounted on the trolley unit 14 and a projection mapping service may be provided. Further, a 3D printer may be mounted on the trolley unit 14 and a rental service of the 3D printer may be provided. Moreover, the trolley unit 14 may be equipped with a city hall function to provide city hall services to users living in depopulated areas. Further, the trolley unit 14 may be used for a moving service.

What is claimed is:

1. A mobile body system including a traveling unit having an autonomous traveling function and a at least one trolley unit having a housing portion for loading an object, the mobile body system comprising:
a detector that detects an amount of objects placed on the housing portion in a first trolley unit; and
a processor that determines an operation of the traveling unit based on the amount of objects detected by the detector, wherein
when the amount of objects detected by the detector is less than a predetermined amount, the processor determines an operation of the traveling unit in which the traveling unit tows a second trolley unit on which an object of the objects is placed to the location of the first trolley unit,
wherein the traveling unit executes the determined operation.

2. The mobile body system according to claim 1,
wherein the traveling unit is configured to be able to be connected to the first trolley unit, and
wherein the processor determines an operation in which the traveling unit moves to a location of the first trolley unit and connects to the first trolley unit.

3. The mobile body system according to claim 1, wherein the processor determines an operation of the traveling unit to move to a destination when the amount of objects detected by the detector is more than a predetermined amount.

4. The mobile body system according to claim 3,
wherein the traveling unit is configured to be able to be connected to the first trolley unit, and
wherein the processor determines an operation in which the traveling unit moves to a location of the second trolley unit and connects to the second trolley unit.

5. The mobile body system according to claim 3, wherein the processor determines an operation in which the traveling unit tows the second trolley unit to the location of the first trolley unit.

6. A mobile body system including a traveling unit having an autonomous traveling function and at least one trolley unit having a housing portion for loading an object, the mobile body system comprising:
- a detector that detects an amount of objects placed on the housing portion in a first trolley unit; and
- a processor that determines an operation of the traveling unit based on the amount of objects detected by the detection unit, wherein
- when the amount of objects detected by the detector is more than a predetermined amount, the processor determines an operation of the traveling unit in which the traveling unit tows a second trolley unit to the location of the first trolley unit,
- wherein the traveling unit executes the determined operation.

* * * * *